US012673709B2

(12) United States Patent
Mendoza et al.

(10) Patent No.: US 12,673,709 B2
(45) Date of Patent: Jul. 7, 2026

(54) RETRACTABLE AND EXTENDABLE HAND TRUCK BASE PLATE ASSEMBLY WITH A SECURING AND RELEASING MECHANISM

(71) Applicants: Harper Trucks, Inc., Wichita, KS (US); Milwaukee Electric Tool Corporation, Brookfield, WI (US)

(72) Inventors: José Angel Caceres Mendoza, Wichita, KS (US); George Albert Barton, Mequon, WI (US)

(73) Assignees: Harper Trucks, Inc., Wichita, KS (US); Milwaukee Electric Tool Corporation, Brookfield, WI (US)

( * ) Notice: Subject to any disclaimer, the term of this patent is extended or adjusted under 35 U.S.C. 154(b) by 124 days.

(21) Appl. No.: 18/240,210

(22) Filed: Aug. 30, 2023

(65) Prior Publication Data

US 2024/0067245 A1      Feb. 29, 2024

Related U.S. Application Data

(60) Provisional application No. 63/402,225, filed on Aug. 30, 2022.

(51) Int. Cl.
B62B 1/12            (2006.01)
(52) U.S. Cl.
CPC ............ B62B 1/12 (2013.01); B62B 2205/24 (2013.01)
(58) Field of Classification Search
None
See application file for complete search history.

(56) References Cited

U.S. PATENT DOCUMENTS

| | | | |
|---|---|---|---|
| 3,104,889 A | 9/1963 | Branch, Jr. | |
| 3,754,771 A * | 8/1973 | Shagoury ............ | B65B 67/1205 280/654 |
| 4,448,440 A * | 5/1984 | Gier .......................... | B62B 1/12 280/655 |
| 6,131,927 A * | 10/2000 | Krawczyk ................. | B62B 1/14 414/490 |
| 6,158,749 A * | 12/2000 | Roudebush ............... | B62B 1/12 182/20 |

(Continued)

OTHER PUBLICATIONS

PCT/US2023/031407 US ISA Written Opinion of the International Searching Authority.

*Primary Examiner* — James A Shriver, II
*Assistant Examiner* — Ian Bryce Shelton
(74) *Attorney, Agent, or Firm* — Robert O. Blinn

(57)            ABSTRACT

A hand truck includes a base plate assembly that can rotate between an extended position and a retracted position. The base plate assembly includes a base plate and upright extending base plate brackets. At least one of the base plate brackets comes into contact at least indirectly with the frame when the base plate assembly is rotated to the extended position. A biased lock and release member is mounted at least indirectly to the frame. The lock and release member is arranged to rotate to an open position against its bias when pressed upon by the base plate bracket. The base plate bracket is secured when the lock and release member returns to its closed position. If the lock and release member is pressed to the open position, the base plate bracket is released and the base plate assembly may be rotated to the retracted position.

2 Claims, 9 Drawing Sheets

(56) References Cited

U.S. PATENT DOCUMENTS

| | | | | |
|---|---|---|---|---|
| 6,234,497 | B1 * | 5/2001 | Stahler, Sr. | B62B 1/002 |
| | | | | 403/103 |
| 6,237,925 | B1 * | 5/2001 | Koenig | B62B 1/12 |
| | | | | 280/47.28 |
| 6,557,869 | B2 * | 5/2003 | Gillette | B62B 1/12 |
| | | | | 414/490 |
| 9,358,994 | B1 * | 6/2016 | Yang | B62B 1/12 |
| 9,810,571 | B1 * | 11/2017 | Su | G01G 19/021 |
| 10,118,631 | B2 * | 11/2018 | Gunther | B62B 1/12 |
| 10,392,041 | B1 * | 8/2019 | Khodor | B62B 1/12 |
| 10,703,397 | B1 * | 7/2020 | Mendoza | B62B 1/12 |
| 11,511,783 | B2 * | 11/2022 | Boyer | B62B 1/12 |
| 12,122,438 | B2 * | 10/2024 | Lawrence | B62B 1/12 |
| 2002/0030351 | A1 * | 3/2002 | Gillette | B62B 1/12 |
| | | | | 280/652 |
| 2004/0200667 | A1 * | 10/2004 | Babkes | B62B 3/102 |
| | | | | 182/20 |
| 2004/0201186 | A1 * | 10/2004 | Tornabene | B62B 1/12 |
| | | | | 280/30 |
| 2009/0014979 | A1 | 1/2009 | Snook | |
| 2012/0049474 | A1 | 3/2012 | Del Rosario | |
| 2015/0014965 | A1 | 1/2015 | Gibson | |
| 2015/0035259 | A1 | 2/2015 | Umbro | |
| 2016/0257327 | A1 * | 9/2016 | Gayk, Jr. | B62B 1/12 |
| 2017/0113826 | A1 | 4/2017 | Ritoski | |
| 2021/0229718 | A1 * | 7/2021 | Boyer | B62B 1/12 |
| 2022/0032445 | A1 * | 2/2022 | Groves | B25H 1/04 |
| 2022/0204063 | A1 * | 6/2022 | Lawrence | B62B 1/12 |

* cited by examiner

RETRACTABLE AND EXTENDABLE HAND TRUCK BASE PLATE ASSEMBLY WITH A SECURING AND RELEASING MECHANISM

RELATED APPLICATIONS

This application claims the benefit of US Provisional Utility Patent Application No. 63/402,225 which was filed on Aug. 30, 2022, which is incorporated herein by reference in its entirety.

FIELD

This application relates to a mechanism for securing a hand cart base plate in an extended position and releasing the base plate so that it can be rotated to a retracted position.

BACKGROUND

Prior art hand trucks are known that include a folding base plate or toe plate that is able to move between an extended, operating position and a folded, retracted position. Such a capability is particularly useful for hand trucks that are able to be configured in two configurations, namely, an upright dolly configuration and a horizontal cart configuration. The prior art teaches examples of mechanisms that facilitate the reconfiguration of handle assemblies relative to frame assemblies so that a hand truck may be reconfigured between at least a dolly configuration and a cart configuration. When in the dolly configuration, the base plate of the hand truck is available for sliding under a load and for facilitating the lifting of the load. When in the cart configuration, the hand truck frame is usually horizontal and is supported at one end by its main wheels and at the other end by secondary wheels. It is also sometimes advantageous, when the hand truck is in the cart configuration, for the base plate to be folded against the hand truck frame. This allows more flexibility for loading objects such as boxes on the hand truck frame. What is needed and what would be advantageous would be a mechanism that is able to be manipulated with either hand or even foot pressure that facilitates the rapid reconfiguration of a base plate between an extended operating position for the dolly configuration, and a retracted, folded-up retracted position, if desired, for more compact storage.

SUMMARY

The above-described need is addressed by a hand truck that includes a frame assembly that is supported by a pair of main wheels and a base plate assembly that is mounted to the frame adjacent to the main wheels wherein the base plate assembly is able to be rotated to and captured in an extended, operating position, and also released and rotated to a retracted storage position.

The base plate assembly which may also be referred to as a toe plate assembly is rotatably mounted to the lower end of the frame so that it is able to rotate between a first, extended position and a second retracted position. When the base plate assembly is in the first, extended position, the base plate extends normally at the lower end of the frame assembly and is oriented to be suitable for sliding under loads that can be lifted when the hand truck is being used as a dolly. When the base plate assembly is in the second, retracted position, the base plate lays against the frame.

The base plate assembly includes a base plate and at least two base plate brackets. The base plate is generally flat and preferably rectangular and is preferably bounded by a proximate edge and a distal edge and two opposite side edges. The base plate may be a thin plate as shown in this example or a low-profile wedge like pan, which, in any case, is adapted for sliding under boxes and the like so that such objects can be picked up and moved by the hand truck. The base plate brackets are fixed to the base plate preferably in locations that are spaced apart and adjacent to the proximate edge of the base plate. The base plate brackets extend normally and upward from the base plate. The base plate assembly which includes the base plate and the brackets is rotatably mounted to the hand truck frame at corresponding locations that are aligned to allow rotation of the base plate assembly around a transverse axis with respect to the hand truck frame. The hand truck frame and at least one of the base plate brackets are arranged such that at least one base plate brackets is in arresting contact with the frame when the base plate assembly is in the first, extended position thereby maintaining the base plate assembly in the extended position. The at least one base plate bracket is also able to pivot away from contact with the frame such that the base plate assembly is able to rotate from the first extended position to the second retracted position in which the base plate preferably lies against the frame.

A lock and release mechanism is mounted at least indirectly to the hand truck frame. The lock and release mechanism is adapted for receiving releasing and securing at least one base plate bracket. The lock and release mechanism includes at least one lock and release member that is rotatably mounted at least indirectly to the frame and is able to rotate between a first closed and a second open position. The lock and release member is biased toward the first closed position. The lock and release member is arranged and shaped so that when the base plate assembly is manually rotated from the second retracted position to the first extended position, at least one of the base plate brackets will come into contact with the lock and release member and thereby cause the lock and release member to rotate from the first closed position against its bias to the second open position. When the lock and release member is in the second, open position, at least one base plate bracket is able to rotate past the lock and release member until the base plate bracket comes into contact with the frame. Once the base plate assembly has rotated to the first, extended position and the base plate bracket has cleared the lock and release member and come into contact with the frame, the lock and release member, being biased toward the first, closed position, is able to rotate back to the first, closed position. When the base plate bracket is in contact with the frame and the lock and release member is in the closed position, the base plate bracket is captured within a slot that is bounded by the lock and release member and the hand truck frame. The lock and release member is also configured so that a force applied by the base plate bracket on the lock and release member will not cause the lock and release member to rotate away from the closed position. Thus, the base plate assembly is captured and secured in the first, extended position.

Releasing the lock and release mechanism to the open position and rotating the base plate assembly from the first, extended position to the second, retracted position is easily accomplished if an operator applies manual pressure on the lock and release member against its bias and toward the open position. This makes it possible to rotate the base plate assembly from the first, extended position to the second retracted position. It is preferable that the lock and release member has portions that extend from the body of the lock and release member that are suitable for receiving manual pressure. Thus, by applying manual pressure, it is possible to rotate the lock and release member against its bias so that the base plate assembly may be released from its captured condition and manually rotated from the first extended position to the second, retracted position.

DETAILED DESCRIPTION

Figure 1:
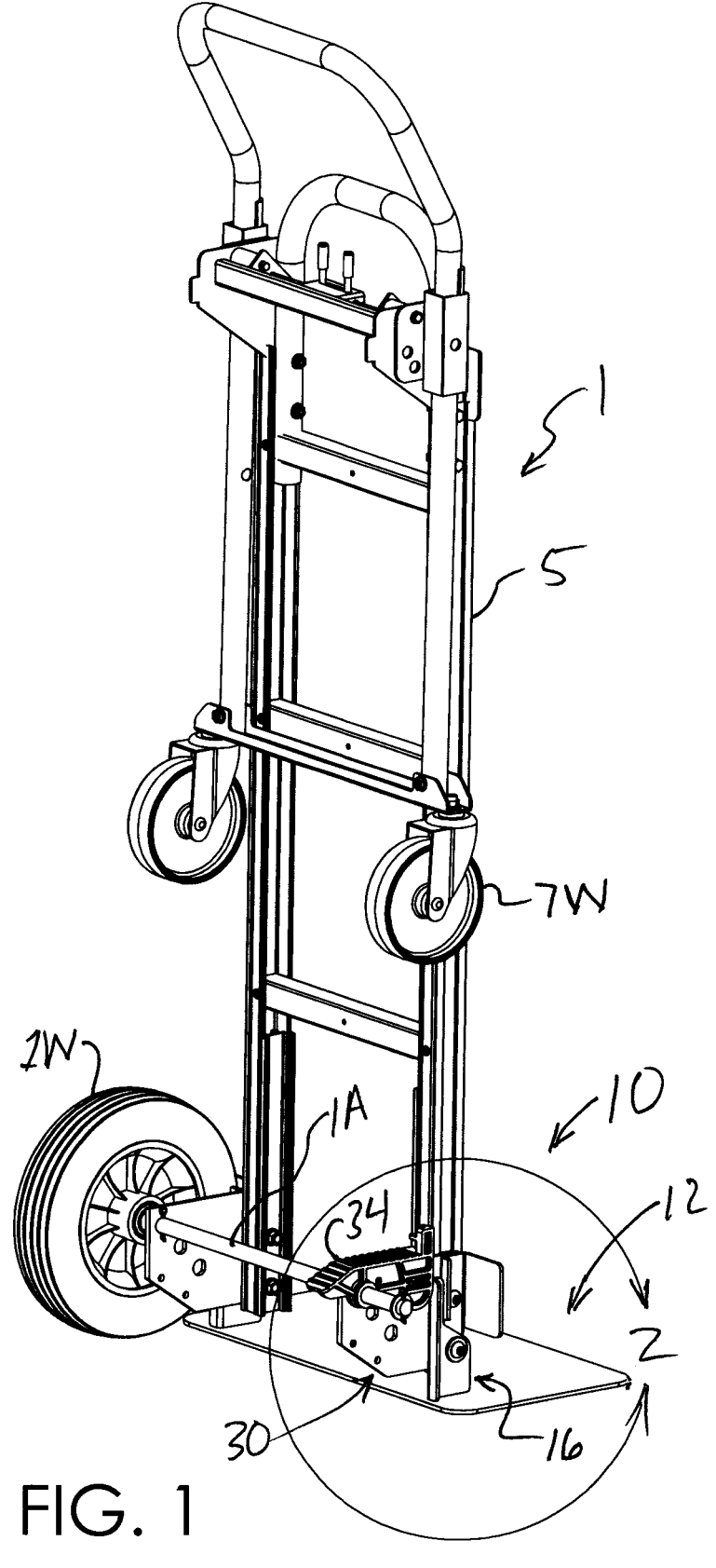
FIG. 1 is a first perspective view of a hand truck that includes one embodiment of a retractable base plate lock and release mechanism.

Referring to the drawings, FIG. 1 shows an example of a multi-position hand truck 1 that includes a retractable base plate assembly 10. Hand truck 1, in this example, is a hand truck that includes a frame 5 and a handle assembly 7 as well as two main wheels 1W (one of which has been removed from FIGS. 1-9 for clarity of illustration) which are mounted to a main wheel axel 1A that, in turn, is supported by opposite spaced wheel brackets 5B. In this example, handle assembly 7 is able to be reconfigured rapidly for at least two configurations, namely, a first upright dolly configuration as shown in FIGS. 1, 3, and 5 and a second cart configuration (not shown) in which frame 5 is generally horizontal and handle assembly 7 is fully extended and rotated so that handle assembly 7 is perpendicular to the end of frame 5 opposite the main wheels 1W with a set of secondary wheels which are mounted to the lower end of handle assembly 7 supporting the end of frame 5 that is opposite main wheels 1W. An example of a multi-position handle arrangement for a hand truck is shown and described in U.S. Pat. No. 10,864,933 which is incorporated herein by reference.

One embodiment of a retractable and extendible hand truck base plate assembly 10 includes a base plate assembly 12 and a securing and releasing portion 30. Base plate assembly 12 includes a base plate 14 and two base plate brackets 16 that are fixed to base plate 14. Base plate brackets 16 are spaced apart and are oriented to extend normally from the upper surface of base plate 14. As can be best seen in FIGS. 2 and 6, in this example, base plate bracket 16 includes a relatively wide lower body portion 16B and a relatively slender upper finger portion 16F that extends away from body portion 16B in a direction that is generally normal to base plate 14. Securing and releasing portion 30 includes a frame bracket 32 and a securing and releasing member 34 which will be described in greater detail below.

Figure 2:
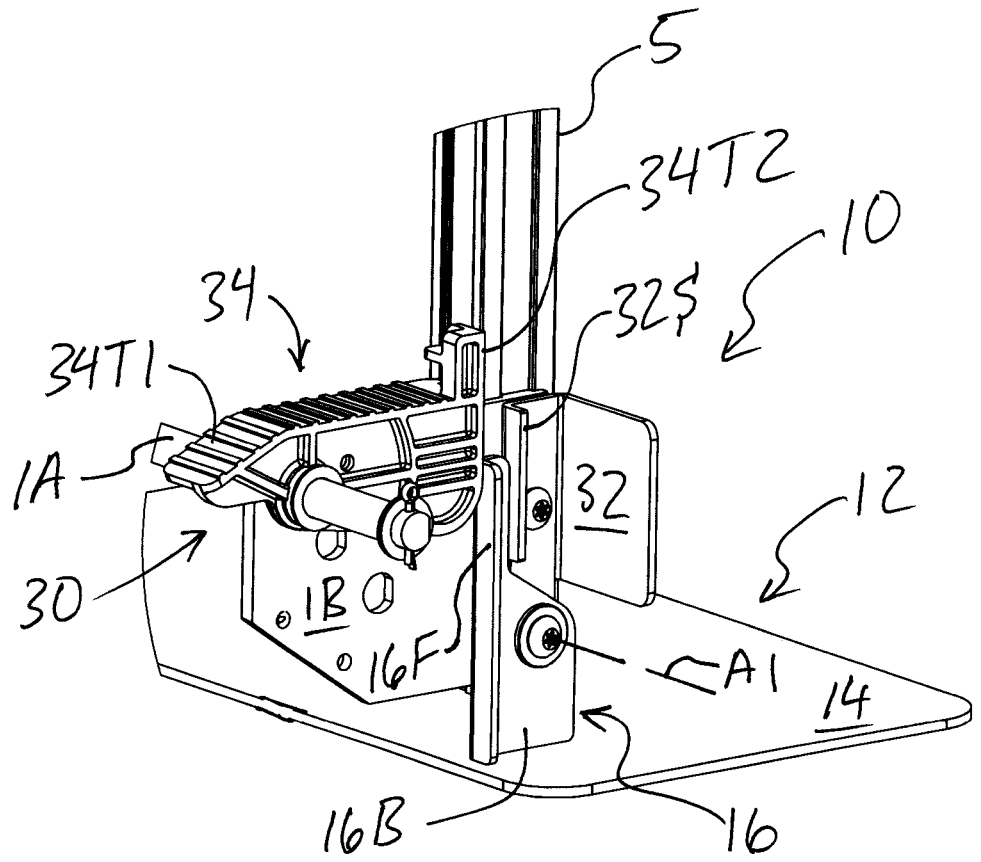
FIG. 2 is an enlarged perspective view of the one embodiment of the retractable base plate mechanism taken from view indication 2 in FIG. 1.
Figure 3:
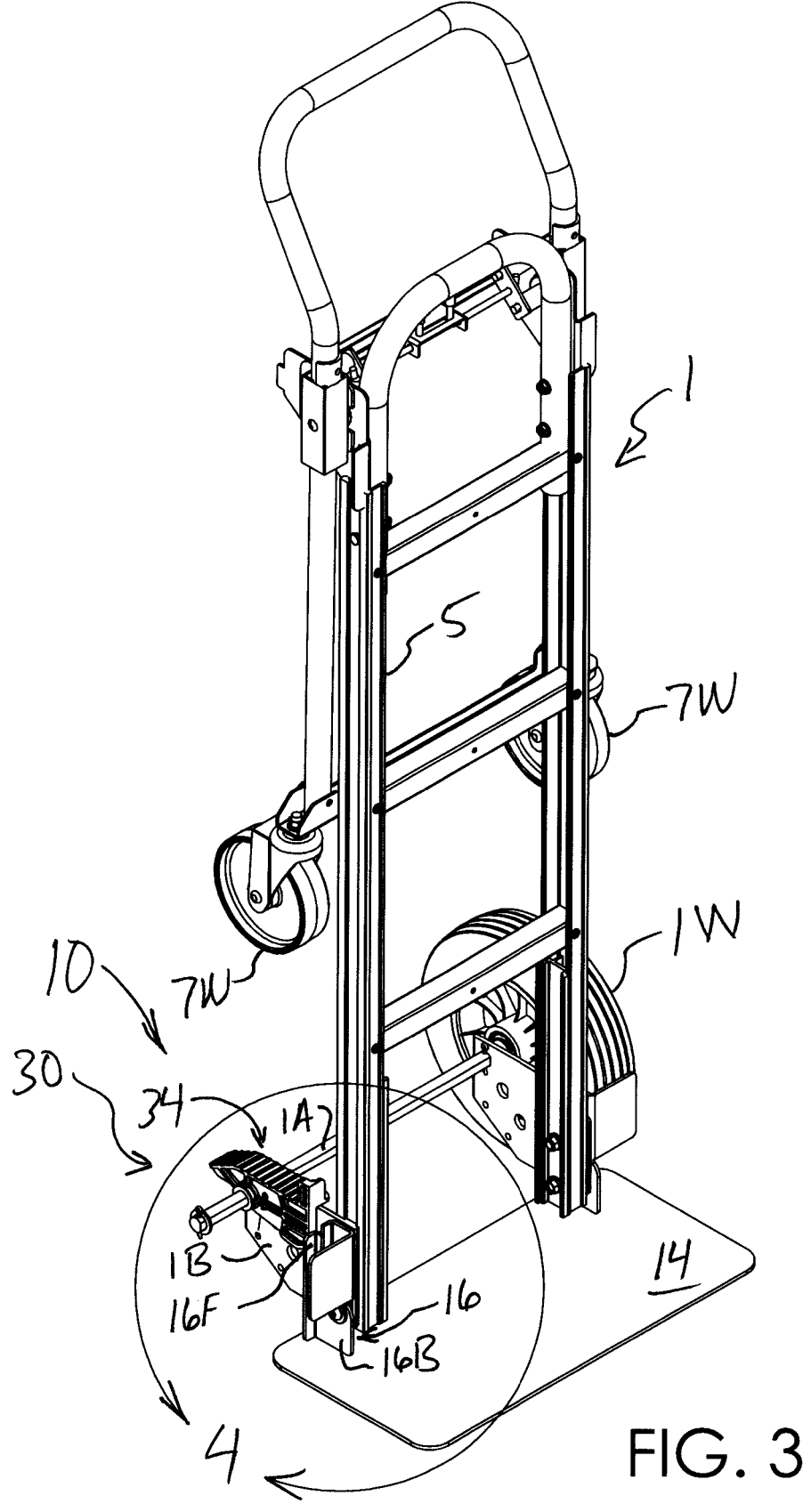
FIG. 3 is a second perspective view of the hand truck showing the one embodiment of the retractable base plate lock and release mechanism.
Figure 4:
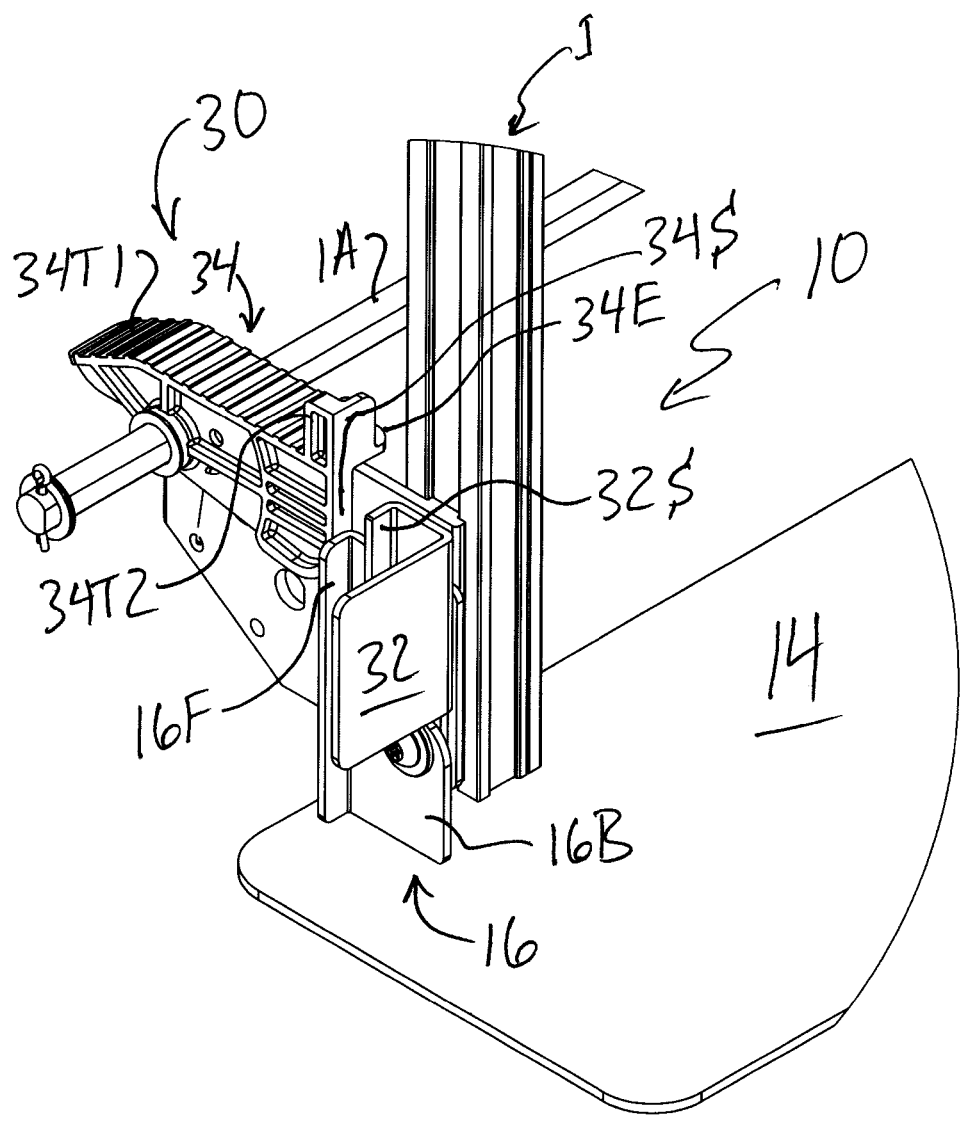
FIG. 4 is an enlarged perspective view of the one embodiment of the retractable base plate mechanism taken from view indication 4 in FIG. 3.
Figure 5:
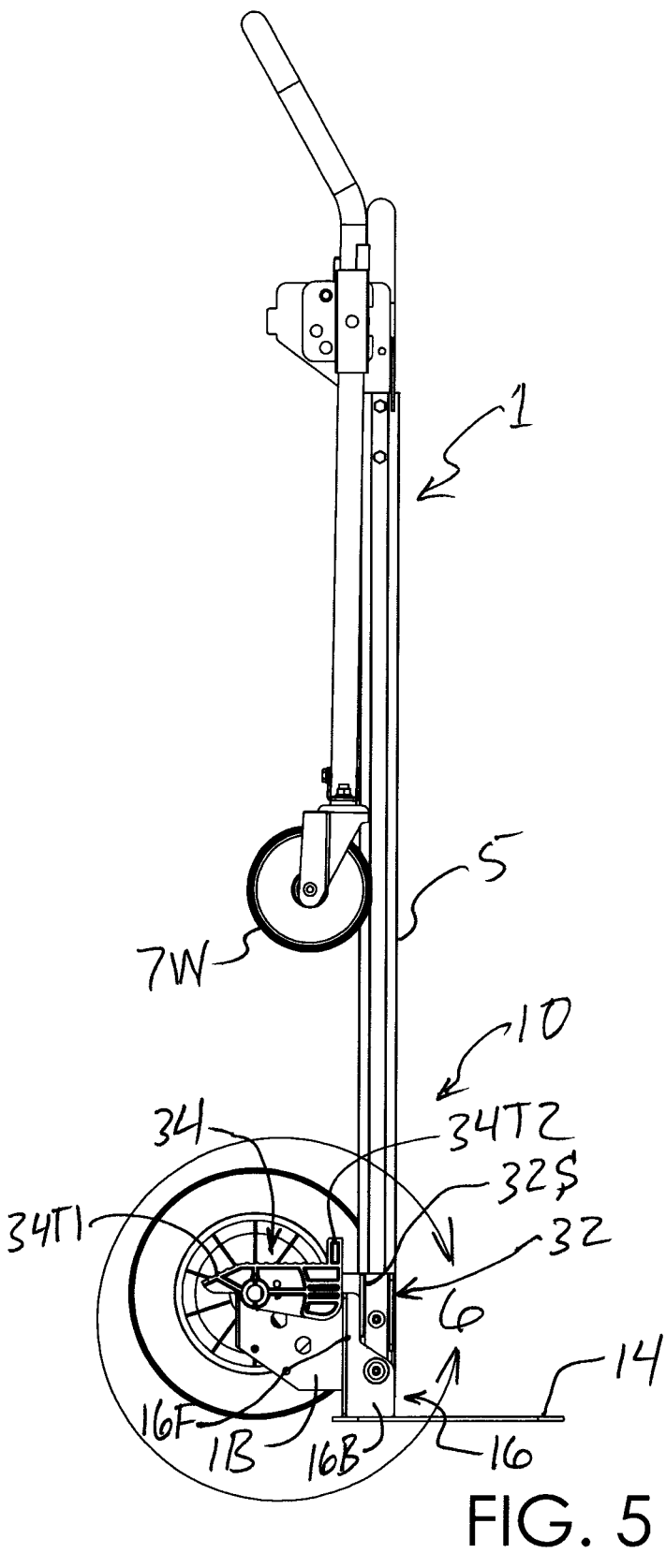
FIG. 5 is a side view of the hand truck showing the one embodiment of the retractable base plate lock and release mechanism.
Figure 9:
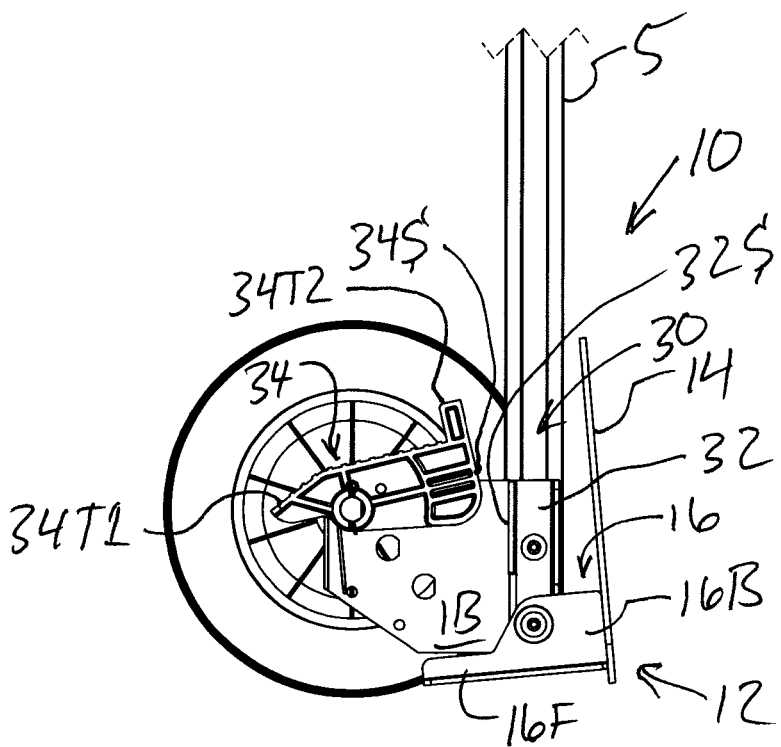
FIG. 9 is a third enlarged side view of the one embodiment of the retractable base plate mechanism showing the base plate assembly in a retracted position and showing the lock and release mechanism in the first closed position.

Base plate assembly 12 is mounted to the lower end of frame 5 so that it is able to rotate with respect to frame 5 about axis A1 which is indicated in FIG. 2 between a first, extended position as shown in FIGS. 1-7 and a second retracted position as shown in FIG. 9. In this example, base plate brackets 16 are both mounted in a rotating fashion for rotation about a common transverse axis A1. Because base plate brackets 16 are fixed to base plate 14, all of base plate assembly 12 rotates with base plate brackets 16 between the extended and retracted positions shown in FIGS. 7 and 9 respectively.

Figure 6:
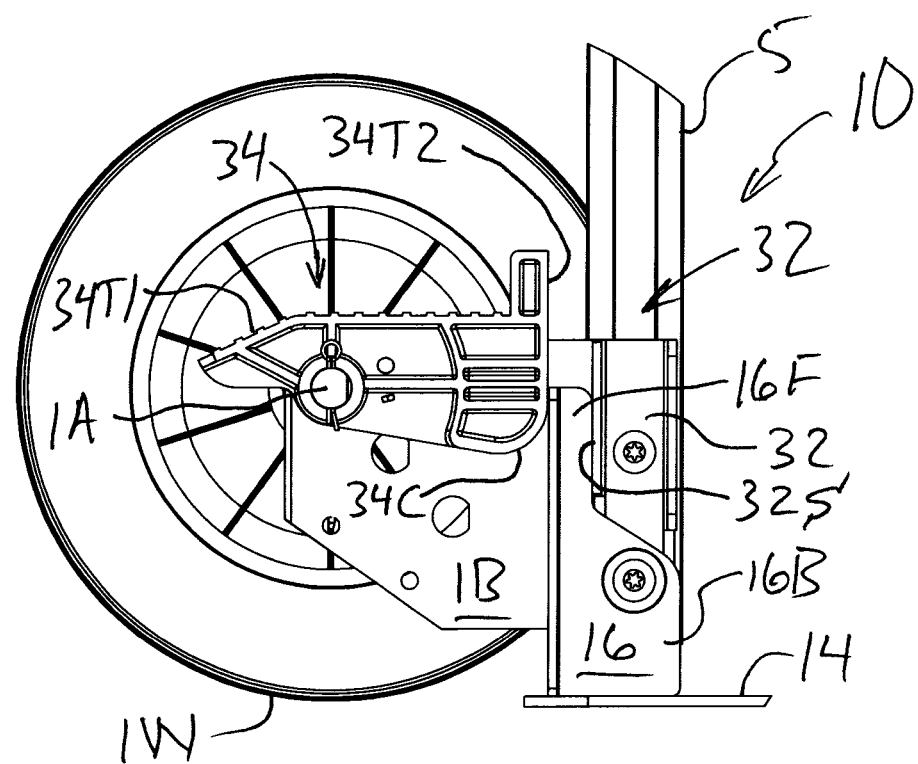
FIG. 6 is an enlarged side view of the one embodiment of the retractable base plate mechanism taken from view indication 6 in FIG. 5.

As noted above and as is best shown in FIGS. 2 and 4, securing and releasing portion 30 includes a frame bracket 32 and lock and release member 34. At least one frame bracket 32 is fixed to at least one of the side members of truck frame 5 as is best shown in FIGS. 2, 4 and 6. Frame bracket 32 presents a flat surface 32A which faces toward lock and release member 34.

In this example, lock and release member 34 is rotatably mounted to main wheel axel 1A and, in this example, is mounted adjacent to wheel bracket 1B. As can be most easily seen in FIG. 4, lock and release member 34 presents a surface 34E which is arranged to come into contact with the upper edge of wheel bracket 1B. In this example, lock and release member 34 is biased by a spring (not shown) that connects between lock and release member 34 and wheel bracket 1B. The spring (not shown) biases lock and release member 34 in the clockwise direction when viewed from the perspective of FIGS. 5-9. Thus, lock and release member 34, if acted on primarily by the spring bias, will rotate clockwise (as viewed from the perspective of FIGS. 5-9) from the open position shown in FIG. 8 to the closed position shown in FIGS. 1-7 and 9 until surface 34E comes into contact with the upper edge of wheel bracket 1B. However, if sufficient manual pressure is applied to at least one of two tabs 34T1 or 34T2 which extend from the body of lock and release member 34, then lock and release member 34 may be rotated counter-clockwise against its spring bias from the closed position shown in FIGS. 1-7, and 9 and toward the open position shown in FIG. 8.

Figure 7:
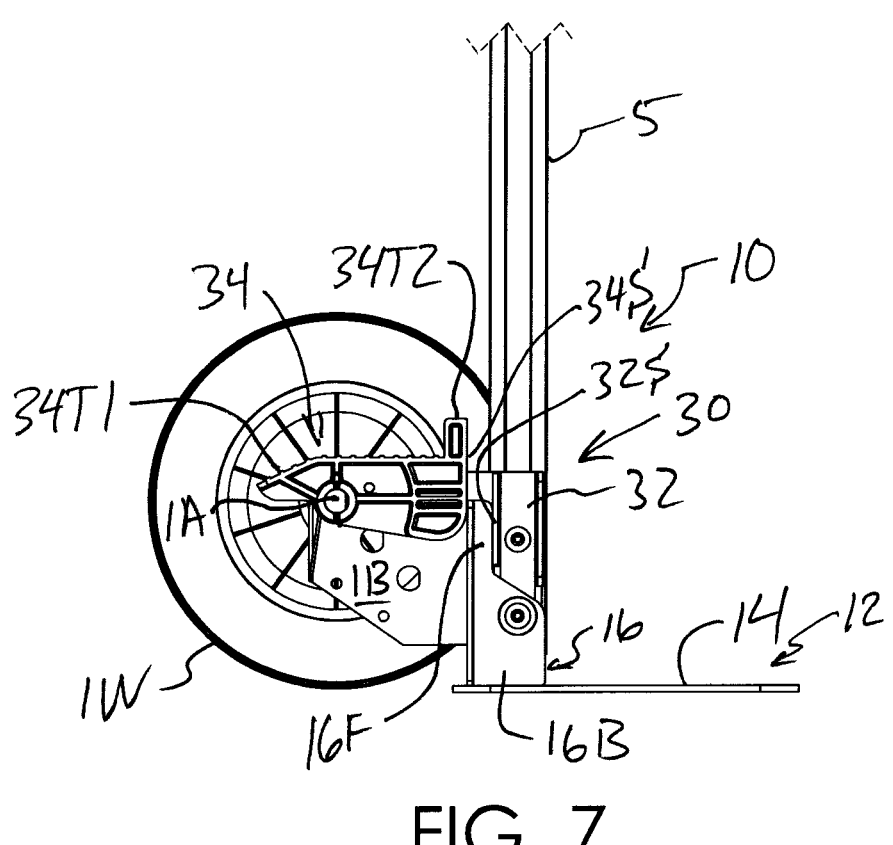
FIG. 7 is a first enlarged side view of the one embodiment of the retractable base plate mechanism showing the base plate assembly in the first extended position and showing the lock and release mechanism in the first closed, securing position.
Figure 8:
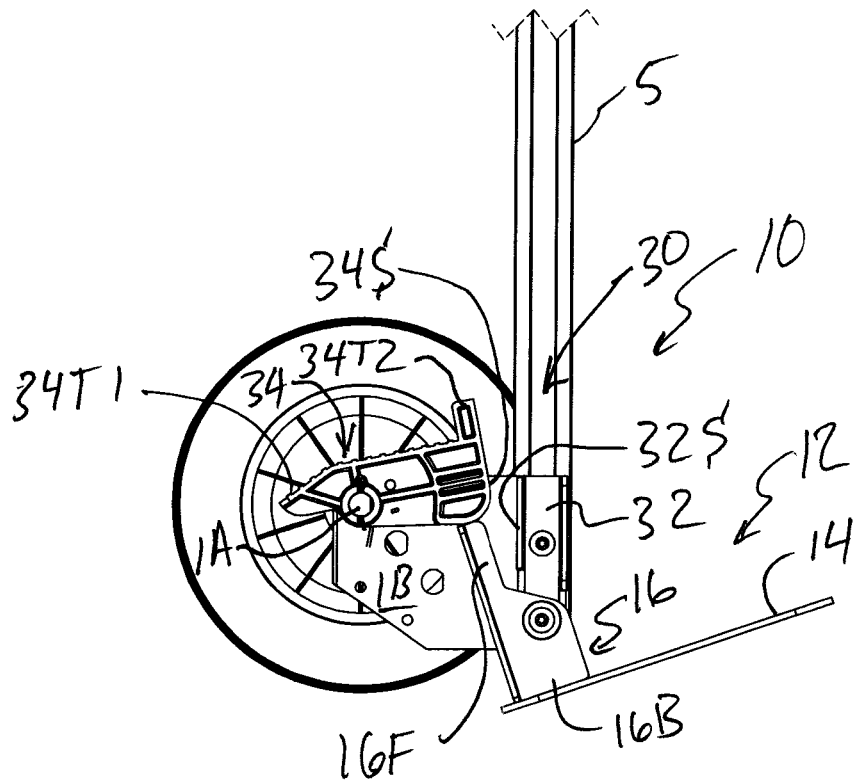
FIG. 8 is a second enlarged side view of the one embodiment of the retractable base plate mechanism showing the base plate assembly in an intermediate position that is rotated away from the first extended position and showing the lock and release mechanism in a second open releasing position.

The operation of lock and release member 34 may be best understood by referring to FIGS. 7-9 while also consulting FIGS. 2, 4 and 6. FIGS. 2, 4, 6 and 7 show lock and release member 34 in the closed position and base plate assembly 12 in the extended position such that the upper finger portion 16F of base plate bracket 16 is captured between frame bracket 32 and lock and release member 34. FIGS. 7-9 show how the finger portion 16F of base plate bracket 16 may be released so that base plate assembly 12 may be rotated from the extended (operating) position shown in FIG. 7 to the retracted position shown in FIG. 9. The configuration shown in FIG. 8 may be initiated by applying manual pressure to either tab 34T1 or 34T2 to rotate lock and release member 34 counter-clockwise (from the perspective of FIGS. 7-9) against its spring bias so as to allow the finger portion 16F of base plate bracket 16 to pass under a curved lower surface 34C (See FIG. 6) of lock and release member 34 and then be further rotated to the retracted position shown in FIG. 9. Tab 34T1 is adapted to be accessible to the foot of an operator for applying pressure to tab 34T1 particularly when the hand truck is in an upright position. Tab 34T2 is adapted to be accessible to the hand or fingers of an operator who might reach though the truck frame to release the base plate assembly in order to fold up the base plate assembly and may be most accessible and useful when hand truck 1 is in a horizontal cart position.

When FIGS. 7-9 are viewed in reverse order, it is possible to understand how base plate assembly 12 may be rotated from the retracted position shown in FIG. 9 to the extended, operating position shown n FIG. 7. As base plate assembly 12 is rotated clockwise (as seen from the perspective of FIGS. 7-9) until the finger portion 16F of base plate bracket 16 comes into contact with curved lower surface 34C of lock and release member 34. The application of manual pressure by an operator on base plate assembly 12 causes finger portion 16F of base plate bracket 16 to press against lower surface 34C of lock and release member 34 causing lock and release member 34 to rotate counter-clock-wise (as viewed in FIG. 8) against its bias such that base plate bracket 16 and lock and release member 34 reach the relative positions shown in FIG. 8. The continued application of manual pressure to base plate assembly 12 causes finger portion 16F of base plate bracket 16 to pass under lock and release member 34 and come into contact with a surface 32S of frame bracket 32. When base plate bracket 16 comes into contact with frame bracket 32 (or at least in very close proximity) there is no longer any interference to hinder lock and release member 34 from rotating clockwise in response to its spring bias into the closed position shown in FIG. 7. Lock and release member 34 also presents a surface 34S which is generally parallel to surface 32S of frame bracket 32. Surfaces 32S and 34S as well as the features of the finger portion 16F of base plate bracket 16 are arranged so that finger portion 16F of base plate bracket 16 is captured between surfaces 34S and 32S until an operator applies manual force upon one of the protruding tabs (34T1 or 34T2) of lock and release member 34 to rotate lock and release member 34 to the open position shown in FIG. 8.

As can be understood from the above description, retractable base plate mechanism 10 provides an easy-to-use capture and release arrangement that is able to receive and capture a base plate member that is fixed to a hand truck base plate (or toe plate) merely by swinging the base plate from a retracted position to an operating extended position. The capture and release arrangement includes a biased lock and release member that is biased to move between an open position to a closed position, and which can be moved from the closed position to the open position either by manual pressure against its bias or if pressed upon by the base plate member if the base plate is being rotated from its retracted position to its extended operating position. If the base plate is in the extended operating position, the base plate member is able to be captured and held in place because, when the biased lock and release member moves into the closed position, the base plate member is constrained on one side by the biased lock and release member and on its opposite other side at least indirectly by a portion of the hand truck frame. The same mechanism also presents features that may be manually pressed upon by an operator so as to release the base plate member thereby allowing the base plate to be rotated from the extended operating position to the retracted position. Thus, it is possible for an operator to quickly extend and secure the base plate in an operating position or retract the base plate to a folded position with simple and intuitive actions.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A hand truck comprising:
a hand truck frame that is supported by a set of wheels that are mounted at least indirectly to the lower end of the hand truck frame for rotation about a wheel axis, the hand truck frame including members which are arranged in a plane to present a flat structure for supporting loads,
a frame bracket mounted at the lower end of the frame that presents a flat surface that is parallel to the plane of the hand truck frame,
a base plate having an upper surface and a lower surface, the base plate being mounted to the lower end of the hand truck frame so that it is able to rotate with respect to the hand truck frame between a retracted position and an extended position suitable for supporting loads, such rotation of the base plate being about an axis that is parallel to the wheel axis,
at least one base plate bracket that is fixed to the base plate, the base plate bracket presenting an upwardly extending finger portion which presents a distal end, the finger portion being arranged to come into arresting contact with the flat surface of the frame bracket when the base plate is in the extended position, and,
a lock and release member that is mounted at least indirectly to the hand truck frame for rotation about an axis that is at least parallel to the wheel axis, the lock and release member being arranged to rotate between an open position and a closed position, the lock and release member also being biased to rotate toward the closed position, the lock and release member having an exterior surface that is shaped so that upper end of the upwardly extending finger portion of the at least one base plate bracket is secured between the exterior surface of the lock and release member and the flat surface of the frame bracket when the base plate is in the extended position and the lock and release member is in the closed position, the exterior surface of the lock and release member also being arranged such that if the base plate bracket is secured between the exterior surface of the lock and release member and the flat surface of the frame bracket, the lock and release member being able to be rotated against its bias toward the open position in order to permit rotation of the base plate from the extended position to the retracted position, and such that when the base plate is in the retracted position, rotation of the base plate toward the closed position will cause the distal end of the finger portion of base plate bracket to press upon the exterior surface of the lock and release member thereby urging the lock and release member to rotate away from the closed position such that the finger portion of the base plate bracket is able to swing into contact with the frame bracket as the lock and release member being biased toward the closed position rotates into the closed position thus capturing the finger portion of the base plate bracket thereby securing the base plate bracket and thus also the base plate in the extended position suitable for carrying loads.

2. The retractable base plate mechanism of claim 1, wherein, the lock and release member also presents at least one feature that may be pressed upon by an operator so as to release the trapping of the upwardly extending finger portion of the base plate bracket thereby allowing the base plate to be rotated from the extended position to the retracted position.

\* \* \* \* \*